United States Patent [19]

Thompson

[11] 3,854,821
[45] Dec. 17, 1974

[54] OPTICAL SYSTEM FOR WIDE BAND LIGHT ENERGY

[75] Inventor: John W. Thompson, Timonium, Md.

[73] Assignee: Westinghouse Electric Corporation, Pittsburgh, Pa.

[22] Filed: Oct. 29, 1971

[21] Appl. No.: 193,944

[52] U.S. Cl............ 356/152, 250/203 R, 250/341, 350/2
[51] Int. Cl............................................. G01j 1/20
[58] Field of Search............ 350/1, 2; 356/4, 5, 152; 250/203 R, 203 CT, 83.3 H; 178/DIG. 21

[56] References Cited
UNITED STATES PATENTS

| | | | |
|---|---|---|---|
| 3,312,759 | 4/1967 | Letter | 350/1 |
| 3,519,829 | 7/1970 | Pradel et al. | 356/4 |
| 3,556,657 | 1/1971 | Quelle, Jr. | 350/1 |
| 3,594,578 | 7/1971 | Ohman | 250/83.3 H |
| 3,609,883 | 10/1971 | Erhard | 273/101.1 |
| 3,674,330 | 7/1972 | Strong | 350/2 |
| 3,698,812 | 10/1972 | Nelson | 356/5 |

Primary Examiner—Richard A. Farley
Assistant Examiner—S. C. Buczinski
Attorney, Agent, or Firm—D. Schron

[57] ABSTRACT

An optical system for use primarily in connection with tracking targets for airborne weapon systems, the optical system having a refractive positive element to pass a wide range of spectral wave length energy including visible and infrared wave lengths, means for separating the energy into a wave length band containing the TV of visual spectral energy and a wave length band containing the IR wave lengths, and sensing means for detecting the images formed by each of the IR and TV light energy bands. Preferably, the system is folded by mirrors for mounting the refractive element for movement about elevational and azimuth axes for tracking of the target.

2 Claims, 6 Drawing Figures

OPTICAL SYSTEM FOR WIDE BAND LIGHT ENERGY

BACKGROUND OF THE INVENTION

1. Field of the Invention

This invention relates to optical systems. More specifically, the invention relates to an optical system for collecting widely divergent bands of wave energy for sensing images formed by each band of wave energy.

2. State of the Prior Art

An airborne weapons delivery system now in use has an infrared tracking system and a television system. Each system receives a beam of light from a different mirror which is gimballed behind a large window in the aircraft. One window is provided for the TV or visible light system and a second window is provided for the infrared (IR) system. The two window system with the gimballed mirrors requires a projection from the aircraft body of rather large proportion. Currently, a window of about six feet wide having an area of about nine square feet is required for this system. The projection increases the air resistance for the aircraft and thereby limits the capabilities of the aircraft.

BRIEF STATEMENT OF THE INVENTION

The invention provides an optical system for collecting widely divergent wave length bands of energy, such as the infrared and visible light energy bands for sensing by electrical equipment. In the invention, the optical window protruding through the aircraft is greatly reduced and the gimballed mirrors are eliminated. According to the invention, a single positive refractive element collects both TV and IR light energy for the TV and IR sensing systems. This light energy is split after refraction into a band containing TV wave length light energy and a band containing IR wave length light energy. The TV wave length band contains wave lengths below about 0.8 microns and the IR band, in the range of about 0.8 to 13 microns. A TV sensor is positioned in the path of the TV light energy band at an image plane for that energy band to detect the image formed by the TV light energy. An IR sensor is positioned in the path of the IR light energy band at an image plane for that energy band to detect for that energy band the image formed by the IR light energy. A suitable refractive element material which passes and refracts all wave lengths from below 0.8 through 13 microns in a sodium chloride crystal.

Preferably, the system is folded by a plurality of mirrors for compaction and to permit rotation of the refractive element about mutually perpendicular elevation and azimuth axes for tracking of the target. A first mirror is positioned to receive the light passing through the refractive element and is mounted with the refractive element for movement about the elevation axis. A second mirror is positioned to receive the reflected light from the first mirror and is mounted with the first mirror and the refractive element for rotation about the azimuth axis.

The optical system can also include a laser energy source located within the optical system so as to project laser energy out to a target coincident with the line of sight of the primary optical system, the reflected laser energy from the target being received and selectively directed to a sensor for calculation of the range between the aircraft and the target. Also the laser can illuminate the target with IR so that heat seeking missiles can home in on it.

BRIEF DESCRIPTION OF THE DRAWINGS

The invention will now be described with reference to the accompanying drawings in which.

DETAILED DESCRIPTION OF THE PREFERRED EMBODIMENT

Figure 1:
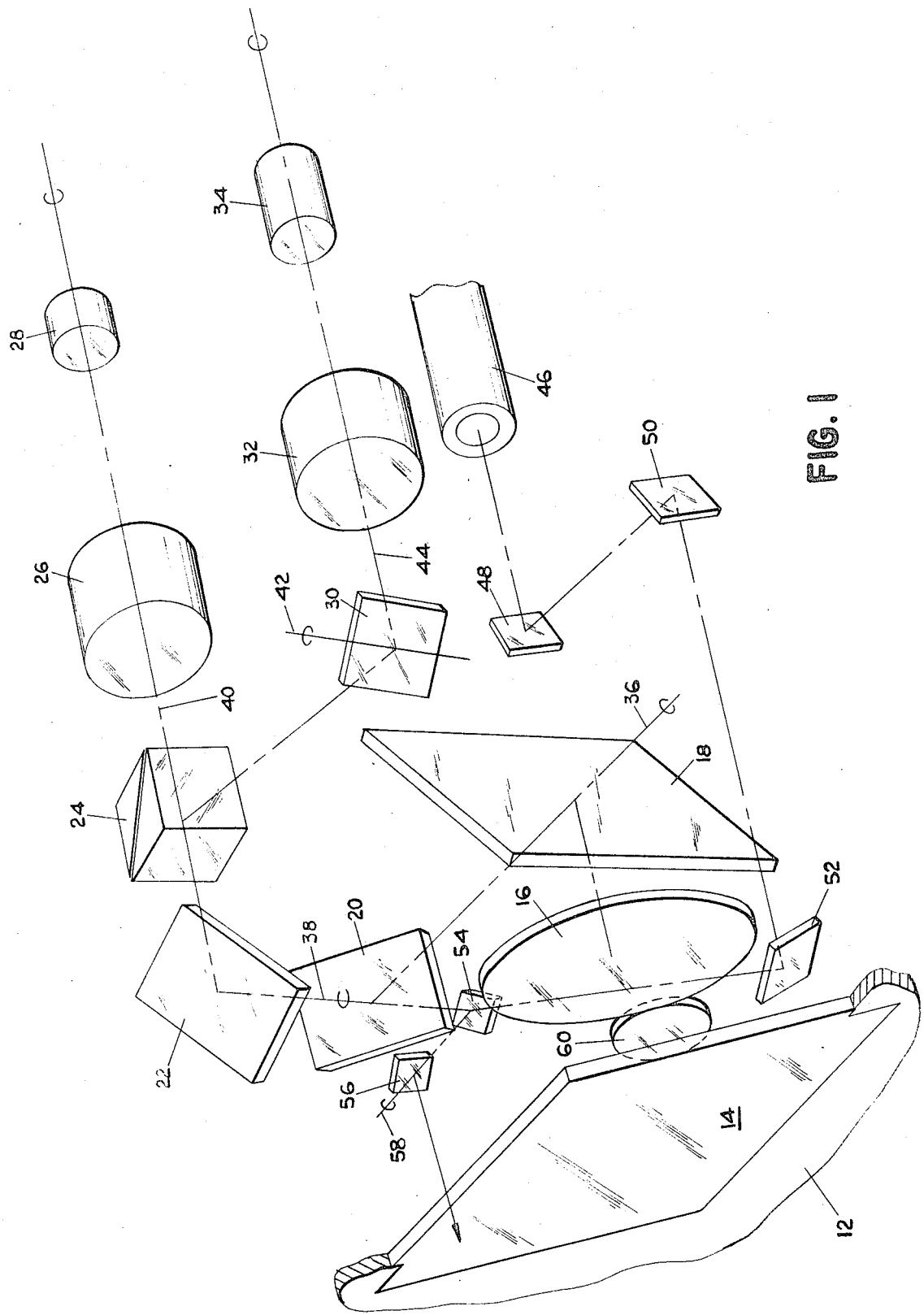
FIG. 1 is a perspective view which schematically illustrates an optical system according to the invention.
Figure 2:
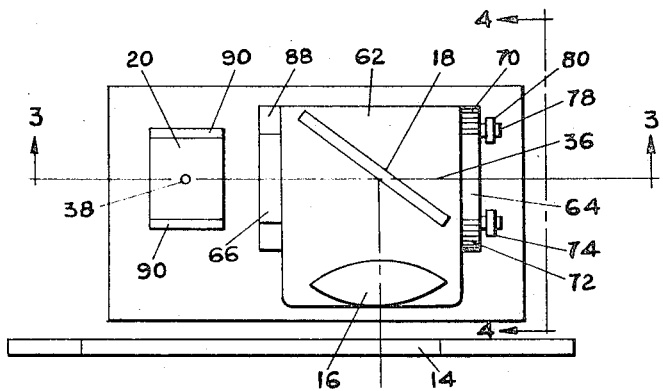
FIG. 2 is a plan view of a portion of the optical system illustrated in FIG. 1 and seen generally along lines 2—2 of FIG. 3.
Figure 3:
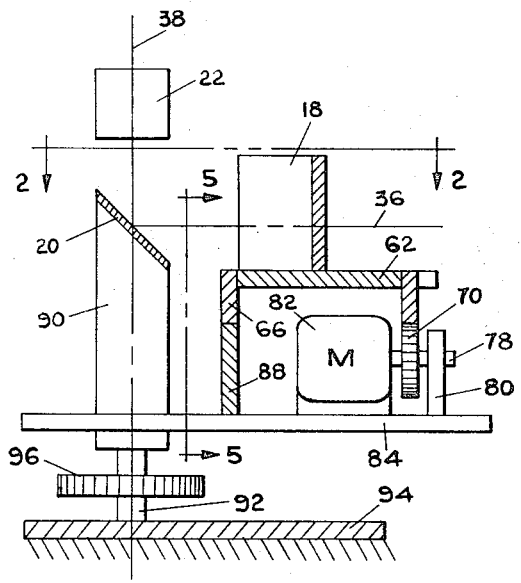
FIG. 3 is a sectional view along lines 3—3 of FIG. 2.
Figure 4:
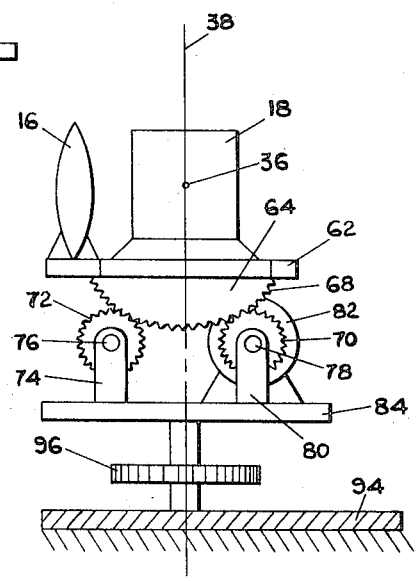
FIG. 4 is a partial side elevational view seen along lines 4—4 of FIG. 2.

Referring now to the drawings, and to FIG. 1 in particular, there is shown an optical system for sensing IR and TV light energy used, for example, in an airplane for tracking a target for an airborne weapon delivery system. As used herein, TV light energy is the spectral energy sensed by a television camera including light in the visual spectrum of a wave length about 0.45 to 0.80 microns. IR light energy as used herein means infrared spectral energy having wave lengths above 0.80 microns and up to 13 microns. An aircraft frame 12 has a window 14 mounted therein for observation from within the aircraft. The window 14 must be able to pass energy ranging from about 0.45 microns (TV band) to about 13 microns, in accordance with the illustrative system herein disclosed.

A primary collector or refractive element 16 is mounted behind the window for refracting the broad band of spectral energy. The collector 16 is an objective lens which forms an image at a focal distance behind the collector 16. The distance of the image from the collecting element will depend on the wave length. A first mirror 18 is positioned behind the collector 16 to receive the light transmitted through the collector 16 and reflects the same to a second mirror 20 which in turn reflects the light upwardly to a third directed mirror 22. The light reflected from the third mirror 22 is directed to a dichroic beam splitter 24 which splits the spectral energy according to wave length. The shorter wave length energy, i.e., the TV spectrum energy which is below 8 microns, is transmitted through the beam splitter 24 to a relay lens 26 and into a TV sensor 28 in which the TV image is formed. The relay lens 26 optically corrects the image formed by the TV light energy. Preferably, the primary image formed by the TV wave length light is positioned between the beam splitter 24 and the relay lens 26. The length of the optical path between the primary collector 16 and the TV sensor 28 is such that the plane for the corrected image for the TV wave length light energy forms on the TV sensor 28.

The sensor 28 is rotatably mounted by means (not shown) about axis 40 which passes through the center of the image and along the axis of the path of the TV light beam entering the TV sensor 28 for derotation of the image.

The reflected beam of light comprising the IR wave length, i.e., 8 microns and above is reflected from a fourth mirror 30 and directed through an IR relay lens 32 into an IR sensor 34. The relay lens 32 optically corrects the image formed by the IR light energy. Preferably, the IR primary image plane is formed between beam splitter 24 and the relay lens 32, and the image plane for the corrected IR image forms on the IR sensor 34.

The first mirror 18 and the primary collector 16 are mounted for rotation about an elevation axis 36 which passes through the center of the light beam impinging on mirror 18 and also passes through the center of the second mirror 20. The second mirror 20, the first mirror 18, and the collector 16 are all mounted on a common mounting not shown in FIG. 1, for rotation about an azimuth axis 38 which intersects the elevation axis 36 at the center of mirror 20. The fourth mirror 30 is mounted for rotation about azimuth axis 42 with the light beam impinging on its surface for scanning of the IR image across the IR sensor 34.

The IR sensor 34 is mounted on an axis 44 passing through the center of the IR image plane and parallel to the axis of the beam 44 for derotation of the IR image.

In operation of the optical system described above, the wide band of light energy passes through the window 14 and is refracted by the primary collector 16. The light energy is reflected from the first mirror 18, from the second mirror 20, and from the third mirror 22 and passes into the beam splitter 24. The TV wave length energy passes through the beam splitter 24, through the relay lens 26 and into the TV sensor 28 wherein a corrected TV image plane is formed. The infrared band wave length energy is reflected by the beam splitter 24, reflected by the fourth mirror 30 and passed through the IR relay lens 32 and into the IR detector 34 wherein the IR image plane is formed.

If it is desirable to track the target, the primary collector 16 and the first mirror 18 are rotated about the elevation axis 36. In addition thereto or in lieu thereof, the primary collector, the first mirror 18, and the second mirror 20 can be rotated about the azimuth axis 38. Using these two axes of rotation, a wide angle of vision can be easily obtained by the system.

The rotation of the collector 16 about the elevation axis 36 and/or the azimuth axis 38 rotates the image with respect to the TV sensor 28 and the IR sensor 34. Accordingly, a simultaneous adjustment must be made by counterrotation of the TV sensor 28 and the IR sensor 34 for a corresponding rotation about the elevation axis 36 or the azimuth axis 38.

The optical system according to the invention can have incorporated therewith a laser illumination and/or distance measuring device illustrated schematically in FIG. 1. A laser transmitter 46 projects a laser beam against a fixed fifth mirror 48 which reflects the laser beam to a sixth mirror 50 which in turn reflects the laser beam to a seventh mirror 52 beneath the primary collector 16. The laser beam is then reflected to an eighth mirror 54 which is mounted for rotation about the azimuth axis 38. The laser beam is further reflected from the eighth mirror 54 to a ninth mirror 56 and then out the same window 14 onto the target. The ninth mirror 56 is mounted for rotation about an elevation axis 58. The laser beam projection onto the target is synchronized by means (not shown) with the movement of the primary collector 16 for movement about the elevation axis 36 and the azimuth axis 38. The laser beam can be used to illuminate the target for detection by the TV sensor during the night time operation of the system.

For example, a laser wave length of about 0.8 microns, although invisible to the human eye, would be detectable by the TV sensor. In addition, the laser beam can be used for calculating the distance from the aircraft to the target. For this purpose, a sensor 60 is provided as a part of the primary collector 16 for detecting the reflected laser beam light energy from the target. Note that the IR sensor 60 is mechanically attached to the primary collector 16, thereby assuring simplicity of mechanizing the system while providing absolute tracking with the line of sight.

Reference is now made to FIGS. 2 through 5 for a description of a system for mounting the primary collector 16, the first mirror 18, and the second mirror 20. In these figures, like numerals have been used to designate like parts. The primary collector 16 and the first mirror 18 are mounted on a first platform 62. Side plates 64 and 66 extend downwardly from the sides of the plate for rotatably mounting the first platform 62 for movement about the elevation axis 36. For this purpose, side plate 64 has a gear tooth edge 68 which has a radius of curvature about the elevation axis 36. Gears 70 and 72 support the side plate 64, gear 72 being rotatably mounted on shaft 76 and supported on a second platform 84 by a pair of brackets 74. Gear 70 is supported for rotation about shaft 78 by a bracket 80 and by a servomotor 82.

Figure 5:
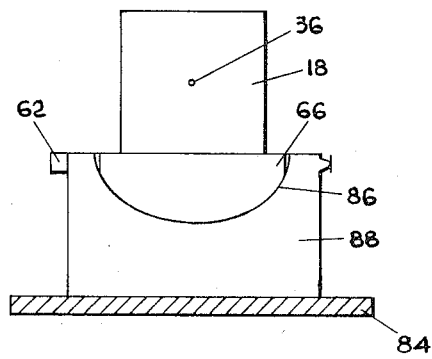
FIG. 5 is a partial view seen along lines 5—5 of FIG. 3.

As seen in FIG. 5, the side plate 66 at the other side of the first platform 62 has accurate edge 86 which fits in an accurate opening in a yoke 88 which is fixed on the second platform 84.

The second mirror 20 is fixed to the second platform 84 by a pair of side brackets 90. A pivot shaft 92 is journalled in a fixed frame member 94 which is secured to the aircraft and supports the platform 84 for rotation about the azimuth axis 38. A gear 96 is fixed to the pivot shaft 92 for rotation of the shaft 92 by power means (not shown) such as a servomotor.

In operation of the system illustrated in FIGS. 2 through 5, the tracking about the elevation axis takes place by the rotation of the first platform 62 about the elevation axis 36. This is accomplished by actuating the servomotor 82 to turn gear 72 which engages the tooth edge 68 of plate 64. The primary collector 16, the first mirror 18, and the second mirror 20 are rotated about the azimuth axis 38 by rotating the second platform 84 about the azimuth axis 38 on the shaft 92. This can be conveniently done by applying a torque to gear 96 through the use of a conventional torquing device. Normally, the motors which rotate the platforms are controlled by a computer.

Figure 6:
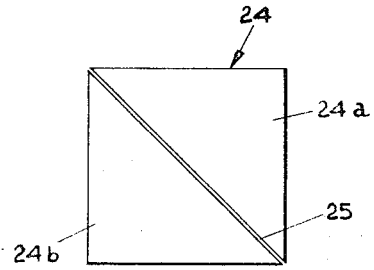
FIG. 6 is a plan view of a beam splitter used in the system illustrated in FIG. 1.

Reference is now made to FIG. 6 which illustrates an example of a dichroic beam splitter which can be employed according to the invention. The beam splitter 24 comprises a pair of right angle prisms 24a and 24b positioned with their hypotenuses adjacent one another and with an air gap 25 therebetween. The air gap 25 is on the order of several microns, for example about 2 to 5 microns. The beam splitter may likewise be of sodium chloride material.

The window 14 which is positioned in front of the primary collector 16 is necessary in high speed aircraft to protect the primary collector from deterioration. As mentioned above, the window 14 must be capable of passing a wide spectrum of light energy which includes the TV spectral band and the IR spectral band. Whereas sodium chloride has the necessary spectral characteristics, it is a relatively soft material and tends to deteriorate too rapidly. However, an example of suitable window material is barium fluoride in crystal or other form.

The primary collector 16 must also be capable of passing the same wide band of spectral energy and must be capable of refracting this band of energy. A suitable collector element is a sodium chloride crystal ground or formed into the shape of a lens.

In general, it will be understood that the subject system permits operation continuous over the range of spectral energy of interest and particularly from about 0.45 microns through 13 microns (or, as alternatively expressed micrometers). Thus, the TV spectral band and the 8–13 micron wave lengths were noted specifically in this case in accordance with the particular system requirements, and may be considered to transmit continuously from 0.45 to 13 microns and thus up to the primary image plane. It will be apparent that a sensor or illuminator, e.g. a laser as above cited and operating at 1.07 microns, could be employed to provide IR illumination and to perform a ranging function.

The optical system of the invention provides a single collecting element for two separate bands of light energy which are split and detected. By contrast, prior art systems utilizing two separate bands of light energy, as in the system of the invention, required two separate gimballed mirrors and two separate windows. With the use of the invention, the window size can be reduced by a factor of about four, thereby increasing significantly the capabilities of the aircraft for high speed operations. This substantial reduction is accomplished by the system of the invention in accordance with two factors. The first factor is the condensation of the two separate tracking systems into a single tracking system permitting use of a single instead of two separate windows and thereby affording a reduction in total window size of about two. The second factor is that of the use of the refractive collecting element in accordance with the invention, thereby permitting elimination of the large gimballed mirrors positioned in front of the primary objective which have been heretofore required for tracking in such weapon systems. Each such gimballed mirror requires a larger window than the refractive collecting element of the invention and, although a function of the field of view, illustratively, it may be larger by a factor of about 2. Thus, the replacement of the mirror by the refractive element, or alternatively, as a result of the interchange of the collector and minor positions, the same tracking can be accomplished with a smaller window. Since the windows must project from the aircraft body, the smaller window means a decrease of the wind resistance of the aircraft. Use of a refractive collecting element rather than gimballed mirrors as in the prior art, in accordance with the invention, also permits the optical system to be more compact, an obvious advantage in the application of such systems.

Reasonable variation and modification are possible within the scope of the foregoing disclosure, the drawings, and the appended claims without departing from the spirit of the invention.

What is claimed is:

1. An optical system for tracking a target from an airborne platform, said optical system comprising:

a positive refractive element positioned within an aircraft for receiving a beam of spectral energy containing visual and IR wave lengths from said target, said refractive element having characteristics permitting passage of visual and IR spectral energy, said refractive element forming an image plane for said visual energy a first optical distance from said refractive element, and forming an image plane for said visual energy a second optical distance from said refractive element;

means mounting said refractive element for movement about an elevation axis and an azimuth axis for tracking said target;

means for splitting said refracted beam of spectral energy into a band containing said visual energy and a band containing substantially said IR light energy;

a first sensing means positioned in the path of said visual energy band for detecting the image formed by visual energy;

means mounting said first sensing means for rotation about a central axis of said path of said visual energy band for derotation of said visual image corresponding to rotation of said refractive element about said elevation and azimuth axes;

a second sensing means positioned in the path of said IR light energy for detecting the image formed by said IR light energy; and means mounting said second sensing means for rotation about a central axis of said path of said IR energy band for derotation of said IR image corresponding to rotation of said refractive element about said elevation and azimuth axes.

2. An optical system according to claim 1 wherein said mounting means includes first and second reflecting elements, said reflecting elements being positioned to successively receive and reflect said beam of light between said refractive element and said splitting means; said refractive element and said first reflecting element being mounted for movement about said elevation axis; said refractive element, said first reflecting element, and said second reflecting element being mounted for movement about said azimuth axis; said elevation axis passing through a central portion of said first reflecting element; said elevation axis and said azimuth axis intersecting in a central portion of said second reflecting element.

* * * * *